Figure 1:
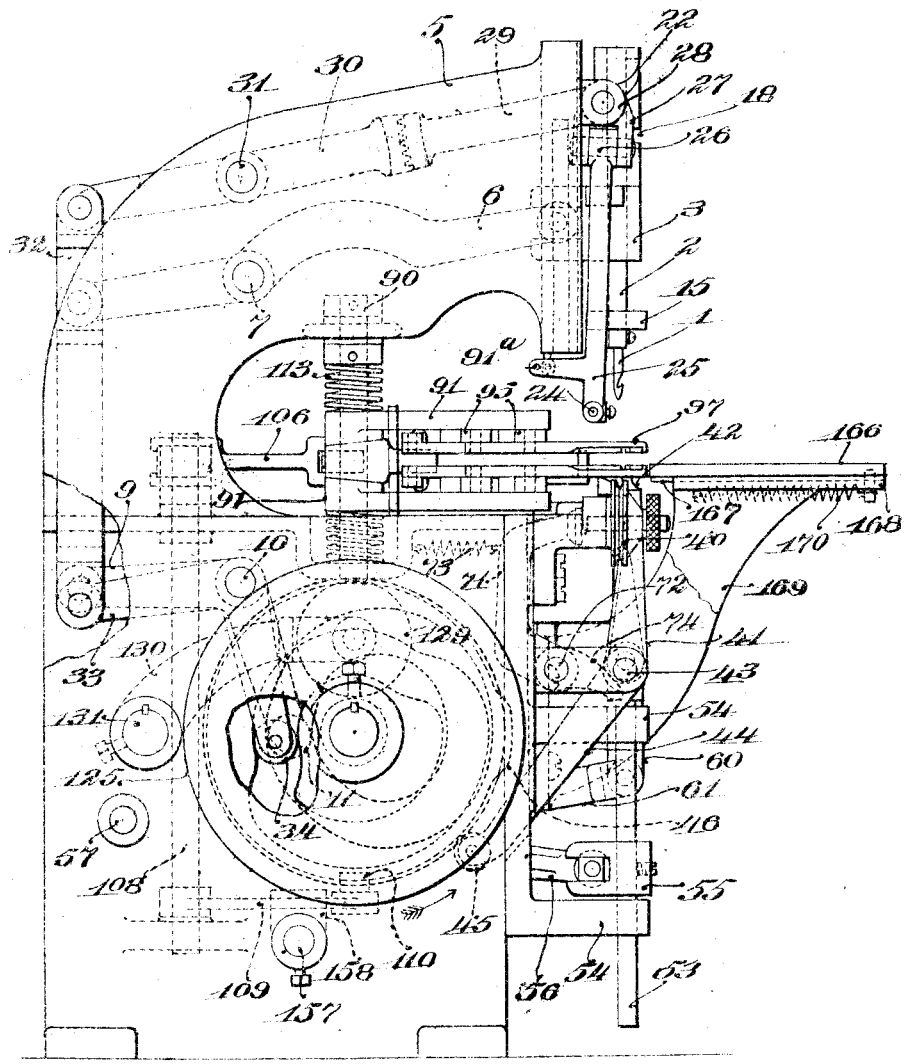

E. E. WINKLEY.
MACHINE FOR LACING SHOE UPPERS.
APPLICATION FILED NOV. 18, 1907.

1,075,530.

Patented Oct. 14, 1913.
8 SHEETS—SHEET 1.

Witnesses
Edward S. Ray
Annie C. Richardson

Inventor
Erastus E. Winkley
by Phillips Van Everen & Fish
Attys

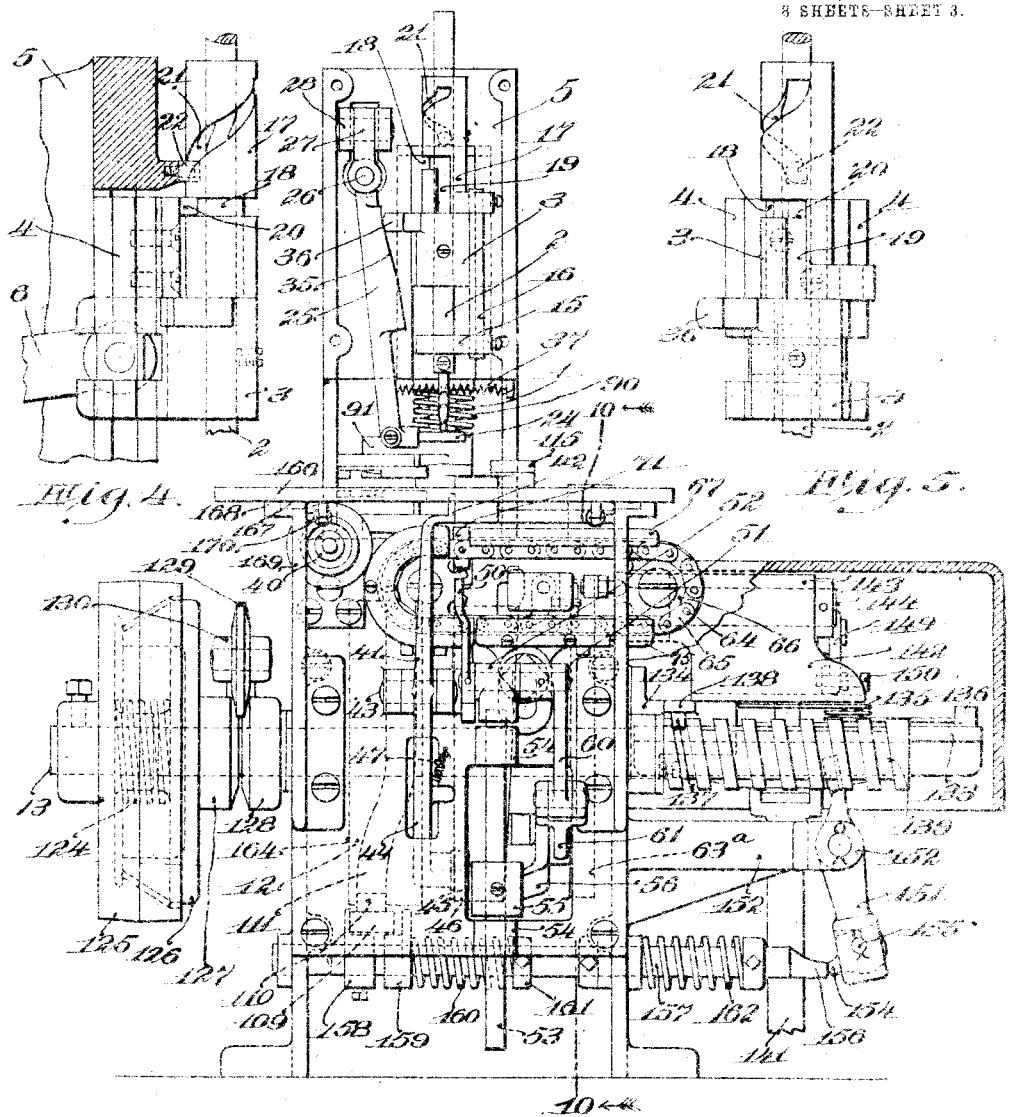

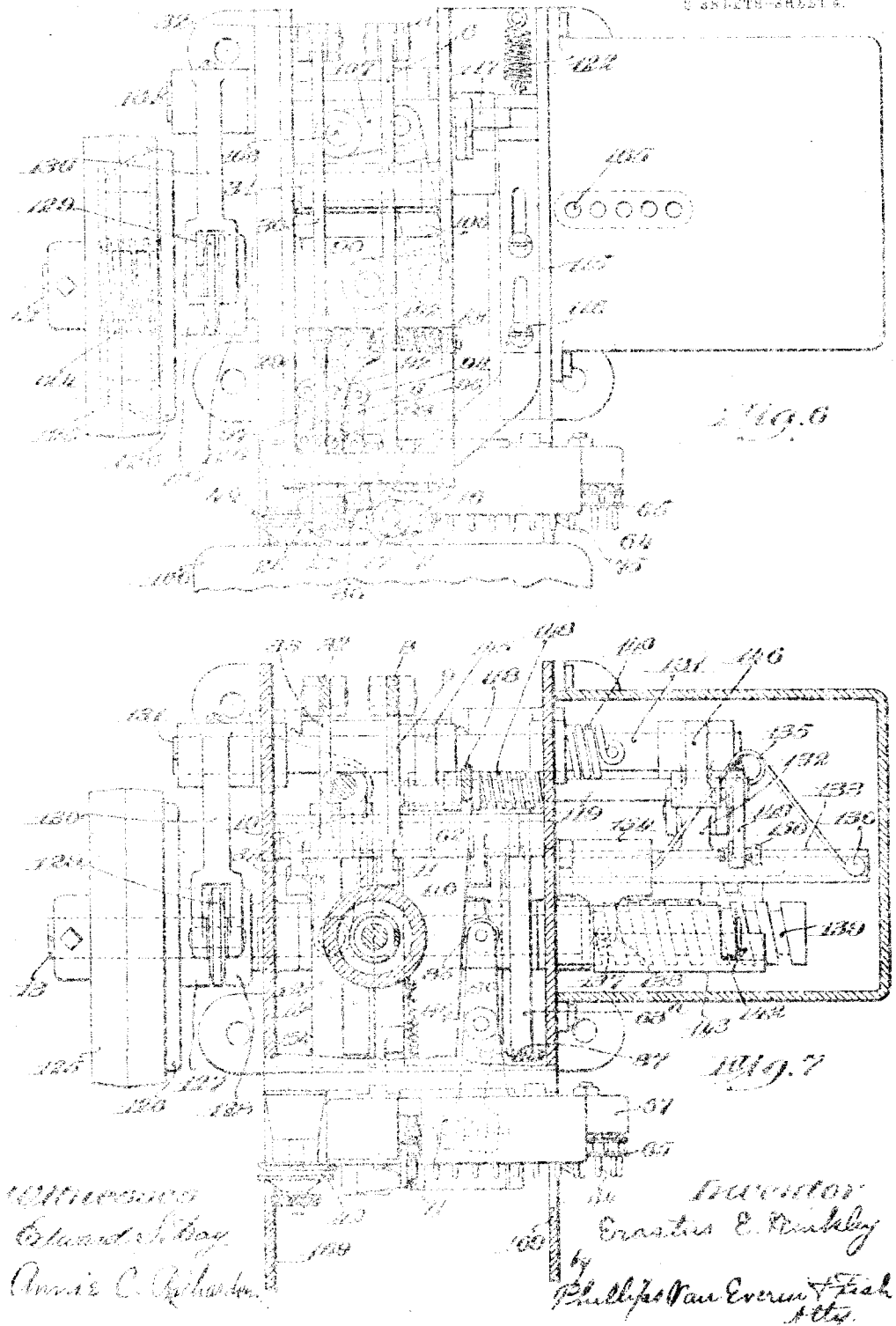

E. E. WINKLEY.
MACHINE FOR LACING SHOE UPPERS.
APPLICATION FILED NOV. 18, 1907.

1,075,530.

Patented Oct. 14, 1913.

8 SHEETS—SHEET 5.

Witnesses
Edward S. Day
Annie C. Richardson

Inventor
Erastus E. Winkley
by Phillips Van Everen & Fish
Atty.

E. E. WINKLEY.
MACHINE FOR LACING SHOE UPPERS.
APPLICATION FILED NOV. 18, 1907.
1,075,530.
Patented Oct. 14, 1913.
8 SHEETS—SHEET 6.
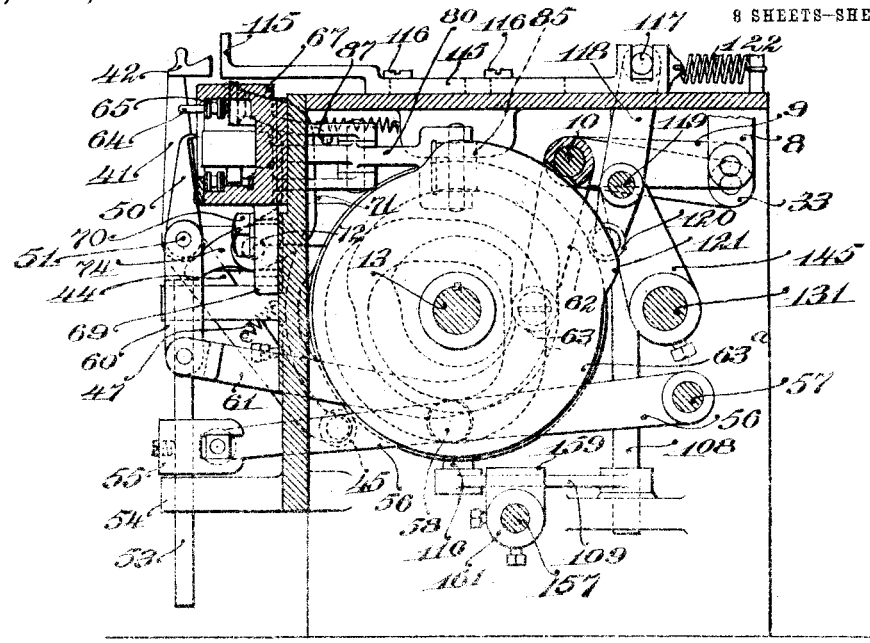
Fig. 10.
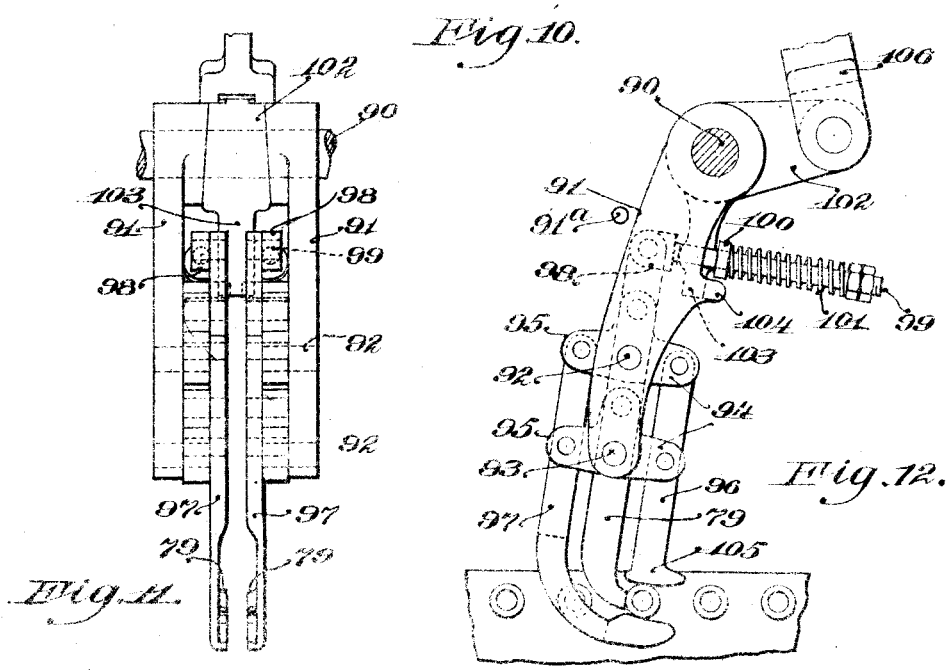
Fig. 11.
Fig. 12.
Witnesses
Edward S. Day
Annie C. Richardson
Inventor
Erastus E. Winkley
by Phillips Van Everen & Fish
Atty.

E. E. WINKLEY.
MACHINE FOR LACING SHOE UPPERS.
APPLICATION FILED NOV. 18, 1907.

1,075,530. Patented Oct. 14, 1913.
8 SHEETS—SHEET 7.

Witnesses
Edward S. Day
Annie C. Robertson

Inventor
Erastus E. Winkley
by Phillips Van Everen & Fish
Atty

E. E. WINKLEY.
MACHINE FOR LACING SHOE UPPERS.
APPLICATION FILED NOV. 18, 1907.

1,075,530.

Patented Oct. 14, 1913.
8 SHEETS—SHEET 6.

Witnesses
Edward S. Way
Annie C. Richardson

Inventor
Erastus E. Winkley
by Phillips Van Everen & Fish
Atty.

UNITED STATES PATENT OFFICE.

ERASTUS E. WINKLEY, OF LYNN, MASSACHUSETTS.

MACHINE FOR LACING SHOE-UPPERS.

1,075,530.  Specification of Letters Patent.  Patented Oct. 14, 1913.

Application filed November 18, 1907. Serial No. 402,574.

*To all whom it may concern:*

Be it known that I, ERASTUS E. WINKLEY, a citizen of the United States, residing at Lynn, in the county of Essex and State of Massachusetts, have invented certain new and useful Improvements in Machines for Lacing Shoe-Uppers; and I do hereby declare the following to be a full, clear, and exact description of the invention, such as will enable others skilled in the art to which it appertains to make and use the same.

The invention relates to machines for lacing together the sides of a shoe upper preparatory to the operation of lasting.
Lacing machines such as have heretofore been used have been of two types, in one of which the lacing is inserted simultaneously in a series of eyelets, and in the other the lacing is inserted in the eyelets successively.
In machines of the first type it is necessary that all the eyelets be properly located before the operation of the machine. This requires a certain amount of dexterity on the part of the operator, and necessitates also certain adjustments of the machine to adapt it to operate upon uppers in which the eyelets are differently spaced and located according to the various sizes and styles of shoes. In machines of the second type the eyelets must be brought successively into position to receive the lacing, and no suitable means for accomplishing this result have heretofore been devised. It has been proposed to secure the upper in a feed frame which is advanced automatically at each operation of the lacing instrumentalities, but this involves the careful adjustment of the upper in the frame by the operator, and makes no account of the fact that the eyelets are frequently so located in the upper that they are neither in a straight line nor at uniform distances apart. It has also been proposed to feed the upper by means engaging the eyelets, but such devices have been arranged to engage the eyelet which has last been operated upon and to move it away a distance which is assumed to be sufficient to bring the next empty eyelet into position, and this arrangement likewise fails to compensate for the non-uniform arrangement of the eyelets, so that in the operation of such a machine there is danger of the lacing-inserting instrumentalities failing to properly engage the eyelets, resulting in stopping or injury to the machine or the upper.

In accordance with certain features of the present invention, devices are provided which automatically engage and locate an empty eyelet, so that when the lacing is inserted it is the eyelet upon which the machine is operating which is positively located, and this is accomplished regardless of the positions of the other eyelets in the series. In the preferred form of the invention, which is arranged to operate upon a succession of eyelets, the eyelet locating devices operate also to feed the eyelets successively into position, and operate always upon the empty eyelet next succeeding that into which the lacing has been last inserted, finding and locating such eyelet whatever may be its position with respect to the others and then moving it positively to a definite position in the machine. In this way the machine operates, without any adjustment or the help of the operator, upon uppers of various sizes and styles and without regard to accidental defects in the placing of the eyelets in the uppers.

The invention also contemplates the employment of eyelet locating devices which will act to bring the eyelets in the two sides of the upper into alinement so that the lacing inserting devices may act to pass the lacing through the eyelets in a uniform and reliable manner and without danger of injury to such devices or to the eyelets.

Another feature of the invention relates to automatic means for causing the end of the lacing to be secured after the lacing has been inserted in the eyelets.

Other objects and features of the invention will be pointed out in connection with the description of the illustrated embodiment of the invention.

Figure 2:
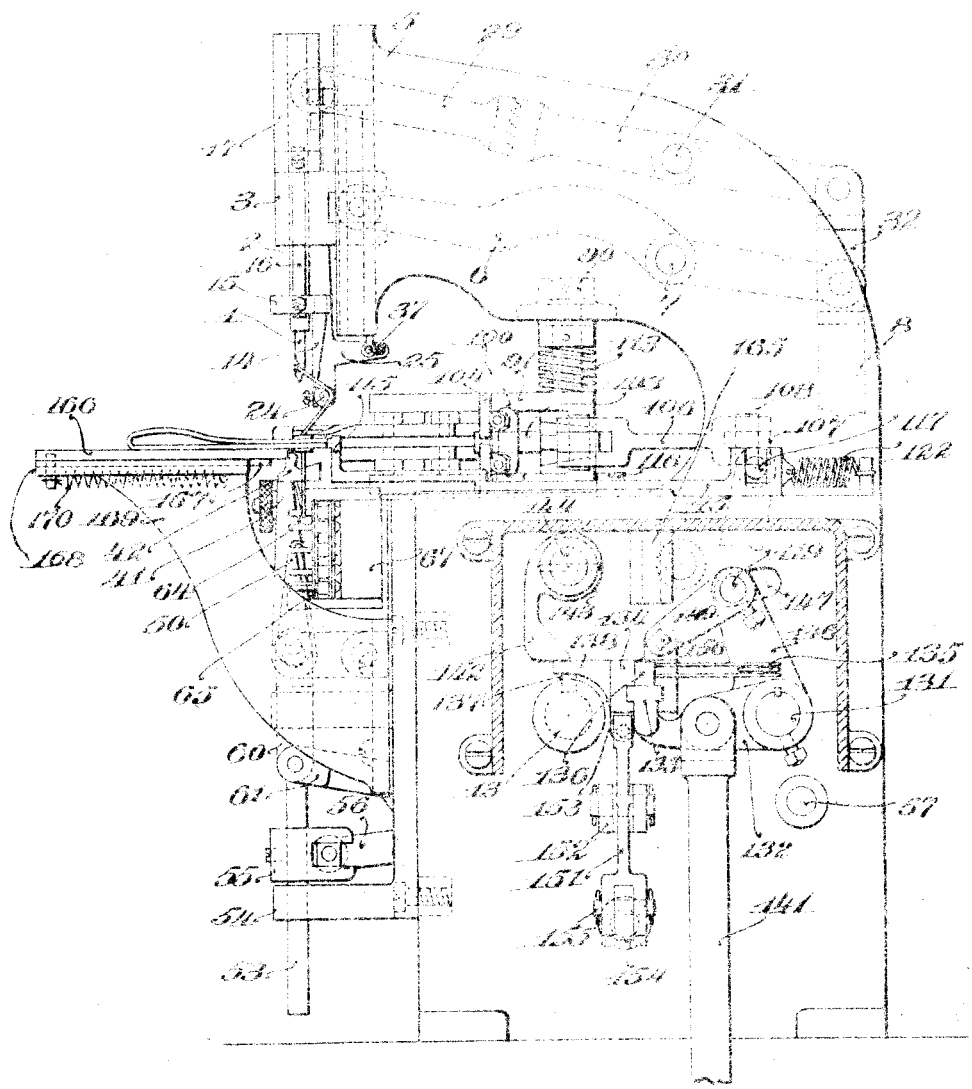
Figure 8:
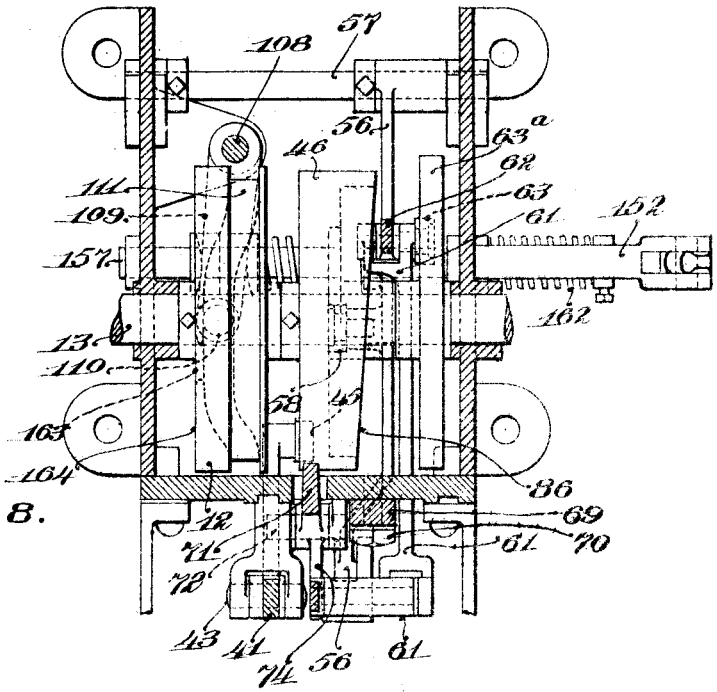
Figure 9:
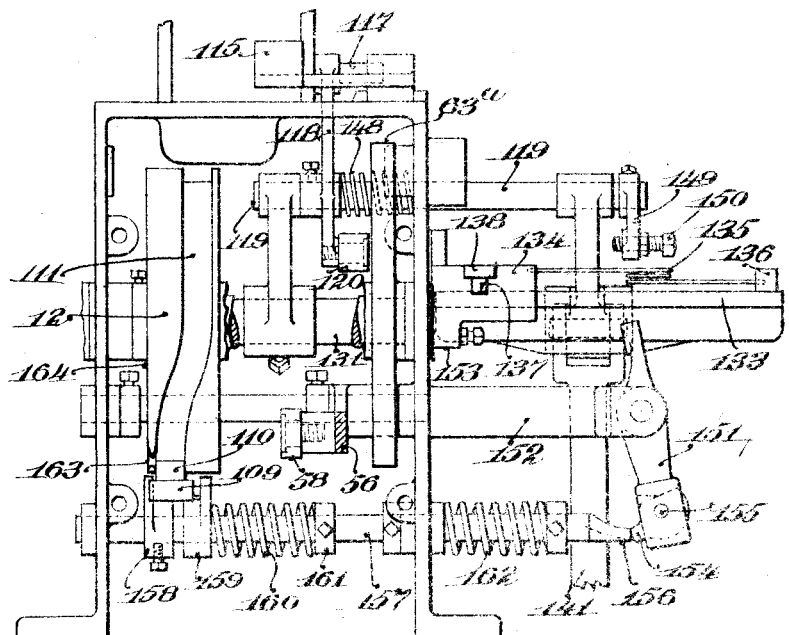
Figure 13:
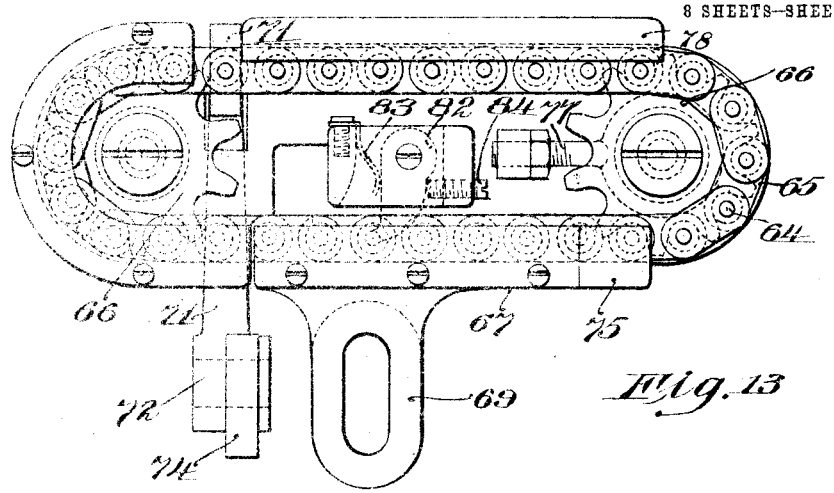
Figure 14:
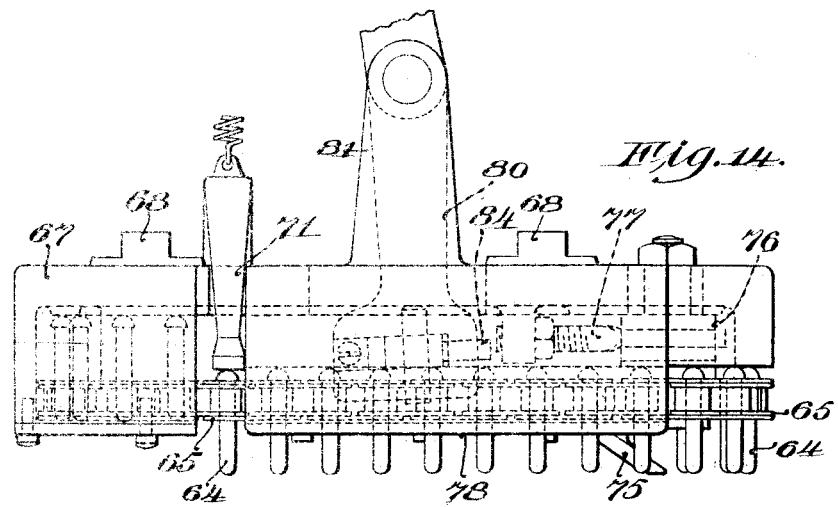
Figure 15:
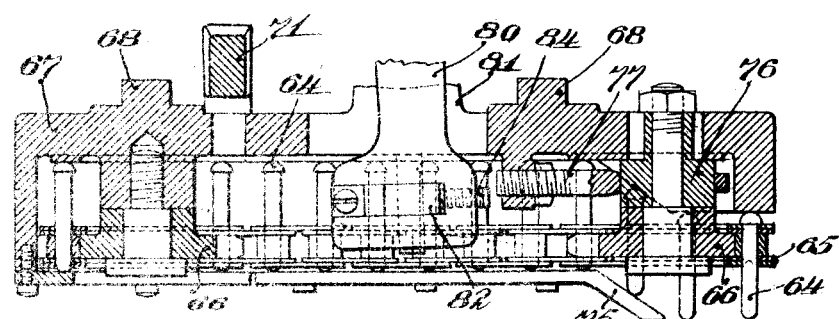
Figure 16:
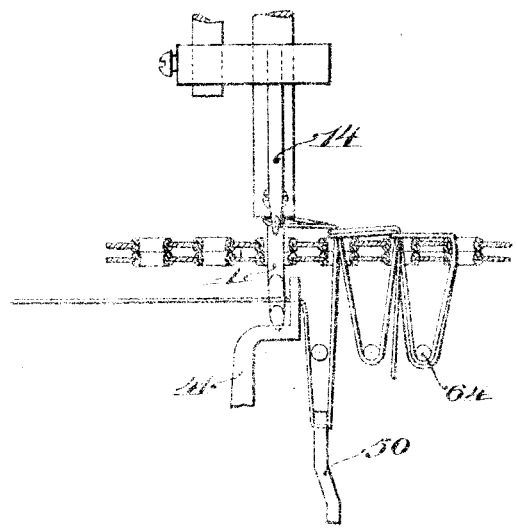
Figure 17:
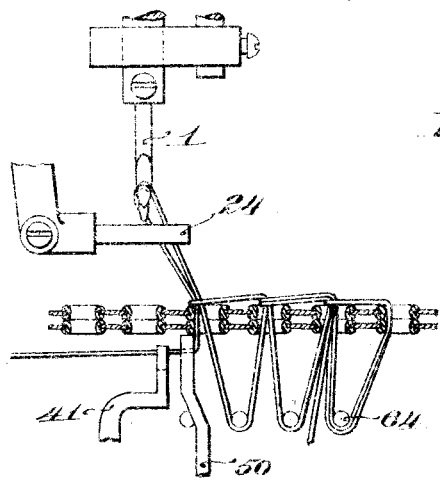
Figure 18:
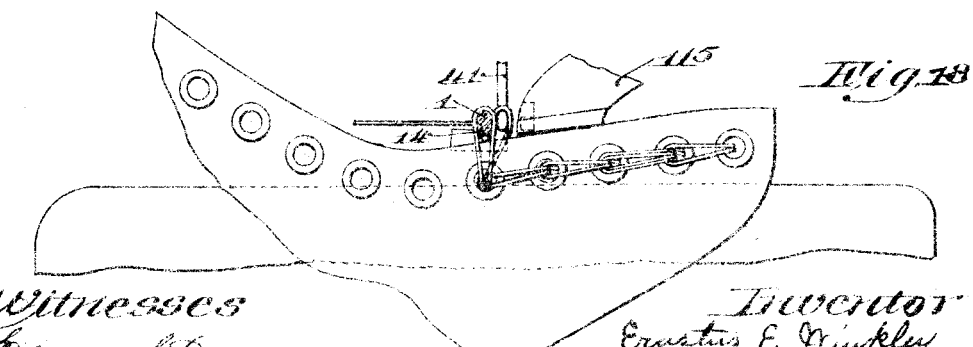

In the drawings, Figure 1 is a side elevation, looking from left to right, of a machine for lacing uppers, embodying the present invention; Fig. 2 is a similar elevation from the opposite direction; Fig. 3 is a front elevation; Fig. 4 is a detail side elevation of a part of the needle and cast-off actuating mechanism; and Fig. 5 is a detail front elevation of the same; Fig. 6 is a plan view of the machine; Fig. 7 is a horizontal sectional view showing the lower portion of the machine; Fig. 8 is a horizontal section showing details of the cam mechanisms; Fig. 9 is a front elevation showing in detail the cam mechanisms and the stop mechanism; Fig. 10 is a transverse sectional elevation on line 10—10, Fig. 3, parts being removed; Figs. 11 and 12 are details of the eyelet engaging devices; Figs. 13, 14 and 15 are respectively a front elevation, a plan view, and a horizontal section showing in detail the loop-holder mechanism; and Figs. 16, 17 and 18 are diagrammatic views showing the mode of operation of the machine.

The features of the invention are shown embodied in a machine in which the instrumentalities by which the lacing cord or thread is inserted in the eyelets of the upper and secured therein are in some respects similar to those of the machine shown and described in the patent of the applicant and John S. Payne, dated June 4, 1907, No. 855,969.

In the machine shown the thread is drawn through the eyelets by means of a hooked needle 1 secured in the lower end of a needle bar 2. The needle bar is fixed in a block 3 provided with guides 4 sliding vertically in ways in the overhanging arm 5 of the machine. This slide block is reciprocated by means of a lever 6 pivotally and slidingly connected with the block 3 as shown particularly in Fig. 4 and pivoted at 7 on the arm 5. The rear end of the lever 6 is connected by a link 8 with a bell crank lever 9 pivoted at 10 on the frame of the machine, and having a depending arm carrying a cam roll 11 which engages a cam path in the side of a cam 12 on the main shaft 13 of the machine.

Beside the needle is a cast-off 14 provided with a hook at its lower end. The cast-off is fixed in a collar 15 free to rotate and to slide longitudinally on the needle bar 2 and the collar 15 is connected by a rod 16 with a sleeve 17 loosely mounted on the upper part of the needle bar. The sleeve 17 is provided with a horizontal slot 18 passing about half way around the sleeve and connected with a vertical slot 19 (see Figs. 3, 4 and 5). These slots are engaged by a pin 20 on the slide block 3. The sleeve 17 is provided with another slot 21 passing helically around one side of the sleeve and engaged by a pin 22 on the frame of the machine. This construction is such that as the slide block 3 descends with the needle bar and needle the pin 20, acting in the horizontal slot 18, draws the sleeve 17, the collar 15, and the cast-off 14 downward with the needle bar, while the pin 22, acting in the helical slot, causes the sleeve 17 and the parts connected therewith to turn at the same time through a half rotation, so as to transfer the cast-off from its original position behind the needle to a position directly in front of it. Upon the completion of this turning movement, further downward movement of the sleeve 17 is arrested by the engagement of the pin 22 with the end of the slot 21, and at the same time the pin 20 enters the vertical slot 19, so that the needle continues and completes its downward movement while the cast-off dwells above the work. Upon the return movement of the needle these operations are reversed.

Coöperating with the needle and cast-off is a thread puller comprising a horizontal pin 24 fixed in the lower end of a lever 25, and the lever 25 is pivoted at 26 in a bell-crank lever 27 journaled in ears 28 on the frame of the machine. This lever has a rearwardly extending arm 29 geared to a lever 30 pivoted at 31 on the frame of the machine, and connected, by a link 32, with a bell-crank lever 33 pivoted at 10 on the frame of the machine, and having a depending arm carrying a cam roll 34 engaging a cam path in the cam 12. Upon the side of the lever 25 is an inclined surface 35 engaged by a lug 36 on the slide block 3. This construction is such that when the slide block 3 descends with the needle the lug 36, acting upon the incline 35, moves the thread puller 24 to the left out of the way of the needle and cast-off, but when the needle rises the thread puller is moved to the right by a spring 37, into the position shown in Fig. 3, and then the cam mechanism above described operates to swing the lever 25 rearwardly into the position of Figs. 1 and 2, so as to cause the thread puller to engage and draw back the needle loop, as shown in Fig. 2, to enable the cast-off to engage the loop upon its next succeeding descent.

The lacing thread passes from a suitable supply around a tension wheel 40 and thence to the stitch-forming instrumentalities. The thread is laid in the hook of the needle, upon each descent of the needle through a pair of eyelets, by means of a thread guide 41 provided with a notched upper extremity 42, across which the thread is drawn at suitable times in the operation of the machine. This thread guide is pivoted at 43 on the frame of the machine and secured to a depending arm 44 carrying a cam roll 45 engaging a cam surface on the periphery of the cam 46 mounted on the main shaft 13. A spring 47 maintains the cam roll in contact with the cam.

To transfer slack thread from the needle loop to the loop retainers and to hold slack thread between the needle and the last formed stitch the machine is provided with a thread finger 50 having a hooked upper extremity and fixed to a rock shaft 51 journaled in a sleeve 52 mounted on the upper end of a bar 53. The bar 53 slides vertically in lugs 54 in the frame of the machine, and is secured to a block 55 articulated with a cam lever 56 pivoted at 57 on the frame of the machine. The cam lever carries a roll 58 engaging a cam path on the cam 46. By these means vertical movements are imparted to the thread finger 50. To impart horizontal movements to the upper extremity of the thread finger the rock shaft 51 is provided with a depending arm 60 connected by a link 61 to the lower end of an arm 62 which is pivoted on the stud 10. The link 61 carries a roll 63 engaging a cam groove in the side of the cam disk 63ª.

The loop retainer mechanism of the present machine comprises a series of horizontal pins 64 which form the pivots of an endless sprocket chain 65 passing around two loosely journaled sprocket wheels 66. These wheels are journaled on a frame 67 which is provided with vertical lugs 68 at the rear engaging suitable ways in the front of the frame of the machine, so as to permit vertical movement of the frame 67 to regulate the distance between the pins and the upper which is being operated upon, and in this way to vary the amount of slack thread held by the pins. To maintain the frame 67 in its adjusted position it is provided with a depending slotted lug 69 engaged by a set screw 70 threaded into the frame of the machine as shown in Fig. 10. The pins 64 fit loosely into side plates of the chain so that they may be moved longitudinally therein at a suitable time in the operation of the machine, to cause them to project successively into the loops drawn down for their reception by the thread finger. For this purpose the rear ends of the pins are engaged successively by a pusher lever 71 which is journaled at 72 on the frame of the machine as shown in Fig. 1. A spring 73 normally holds the lever in retracted position, but the lever is provided with a forward extension 74 located in the path of the hub of the thread finger, so that when the thread finger descends the extension 74 is depressed and the upper end of the lever 71 engages the adjacent pin and moves it forward into the loop drawn down by the thread finger. The pins 64 remain in projected position during the operation upon an upper, but are afterward retracted by the inclined extremity 75 of a cover plate fixed to the front of the frame 67. One of the sprocket wheels 66 is journaled upon an adjustable bearing 76 horizontally movable by means of a screw-threaded stem 77 provided with a suitable adjusting nut, this mechanism being provided to take up any slack in the sprocket chain. The upper portion of the frame 67 is provided with a rail 78 bearing against the upper sides of the pins to support them against the upward pull of the thread loops when they are projected into operative position.

At each feed movement of the upper it is necessary to advance the chain and the pins 64 to bring a new pin into position to receive a loop, and this is accomplished by a lever 80 journaled on lugs 81 projecting from the rear of the frame 67. Pivoted to and depending from the forward end of the lever 80 is a pawl 82 which engages the pins on the lower portion of the chain as shown in Fig. 13. Upon a movement of the lever to the left the pawl will advance the pin engaged by it and thereby move the entire chain through a space equal to the distance between two pins, and upon the return movement of the lever the pawl swings idly to the left, being returned to position by a spring 83. By means of an adjusting screw 84 engaged by the pawl in its normal position the exact position to which the pins are fed may be adjusted. The lever 80 carries at its rear end a cam roll 85 engaging a cam path 86 on the cam 45, and a spring 87 connected to the lever 80 and to the frame of the machine maintains a cam roll in engagement with the cam.

The automatic means for locating and feeding the eyelets are arranged to act upon the flanges of the eyelets at each side of the upper. A vertical stud 90 is fixed in the frame of the machine, and upon this are pivoted two horizontal arms 91 projecting forwardly and provided with pivots 92 and 93. Three-armed bell crank levers are mounted upon these pivots and provided with lateral arms 94 upon the extremities of which are pivoted bars 96 formed at their forward extremities to engage the inside edges of the eyelet flanges above and below the shoe upper. The bell crank levers are provided with oppositely-extended arms 95 to which are pivoted bars 97 formed at their forward extremities to engage the outside edges of the eyelet flanges. The bell crank levers are provided with rearwardly extended arms upon which are pivoted bars 79 constituting feeding devices. The rear ends of the bars 79 are pivoted to forked heads 98 secured to stems 99. A collar 100 slides loosely on the stems 99, and is engaged by compression springs 101. Between the hubs of the arms 91 a bell crank lever 102 is journaled upon the shaft 90, and provided with a forwardly extending arm 103 which is engaged on either side by the heads 98 and the collar 100, these parts being normally maintained in engagement by the springs 101. The extremity of the arm 103 also engages lugs 104 on the ment by the springs 101. The extremity of feeding device 79 are thin and flexible and are curved toward one another as shown in Fig. 11.

The shoe upper which is to be laced is doubled so as to superpose the corresponding eyelets on its two sides, and the upper is then inserted between the upper and lower portions of the locating and feeding device. At suitable times in the operation of the machine the bell crank lever 102 is rocked upon the shaft 90 by means comprising a link 106 connecting it with an arm 107 on the upper end of a rock shaft 108 and an arm 109 secured to the lower end of the rock shaft and carrying a cam roll 110 engaging a peripheral cam path 111 in the cam 72. This movement of the bell crank lever 102 operates first to swing the arms 91 of the eyelet-engaging device to the right, owing to friction between the hubs of the bell crank lever and the arms 91 which are forced normally together by springs 113 on the fixed stud 90. At this time the eyelet-engaging devices are separated, so as to embrace an eyelet, whatever its size, and in spite of variations in its position, and as the arms 91 are moved by the bell crank lever the flexible extremities 105 of the feeding devices encounter and are arrested by the flanges of the eyelets next succeeding those which have already been engaged by the needle. As soon as the feeding devices thus encounter the eyelets, the movement of the arms 91 is temporarily arrested, and the continued movement of the bell crank lever then operates through the spring 101, rod 99, and rod 79, to swing the bell crank levers to the right so as to cause the eyelet-engaging devices 96 and 97 to move toward each other. By this movement of the eyelet-engaging devices the eyelets are accurately located in the feeding device and are brought into accurate alinement. When this has occurred, the continued movement of the bell crank lever 102 causes the spring 101 to be idly compressed until the arm 103 comes into contact with the lugs 104 on the arms 91, and thereafter the arms are moved positively with the bell crank lever to perform the feeding movement and advance and locate the eyelets accurately in the path of the needle. It will be noted that owing to the mechanical arrangement above described the feeding devices 79 and the eyelet engaging devices 96 and 97 advance simultaneously and radially toward the eyelets so that they locate the eyelets properly with their centers at the required point, regardless of the diameter of the eyelets, and also, owing to the fact that the eyelet-engaging devices are separated at the beginning of their movement, they will find and properly engage the eyelets, although the position thereof varies considerably, owing to differences in the upper. Since it is the last extremity of the feeding movement which is fixed and invariable, it follows also that the eyelets are always brought exactly to the proper point in the machine in spite of variations in the distance between them, such as may occur, accidentally or intentionally, in inserting the eyelets in the uppers, and thus no adjustment or manual assistance is required in the feeding operation of the machine to adapt it to operate upon various sizes and styles of uppers. After the needle has entered the eyelets which have been thus centered and fed into accurate register with the needle, the bell crank lever 102 is moved in the reverse direction. During the first movement of the lever the arms 91 and eyelet-engaging devices remain stationary, being held by the tension of the spring 101 which is sufficient to overcome the friction between the hubs of the arms 91 and the bell crank lever. When the arm 103 engages the heads 98 on the stems 99 the eyelet-engaging devices and the arms 91 move back with the bell crank lever until the arms strike a stop pin 91ª. The arms 91 then stop and the continued movement of the bell crank lever moves the bars 79 toward the left in Fig. 12, swinging the three arm levers 84 and separating the eyelet engaging devices 96 and 97 preparatory to the next forward movement. During the return movement flexible extremities 105 of the feeding devices ride over the eyelets in the rear of those just acted upon and spring forward into position behind the eyelets. The hubs of the bell crank lever and arms 91 may be slightly inclined, as indicated in Fig. 11, for the purpose of relieving the friction between the bars 96 and 97 and the upper during the return stroke of the positioning and feeding devices. In each case the relative movement between the bell crank lever and the arms which takes place at the beginning of the reverse movement of the bell crank lever will cause a slight spreading of the arms 91 during the return stroke. On the forward stroke the arms will be again pressed toward each other when the bell crank lever moves relatively to the arms to operate the centering devices.

After the lacing has been inserted in the required number of eyelets it is necessary to secure the end of it, and to this end an automatic device is provided which operates to move the upper laterally, so that the next succeeding and final stitch is formed outside of the edge of the upper. A pusher 115 is located in position to engage the edge of the upper just at one side of the needle. This pusher is normally out of engagement with the upper, and is mounted on a slotted slide secured by screws 116 in the frame of the machine. The rear end of the slide is forked and engaged by a pin 117 in the upper end of a cam lever 118 journaled on a rock shaft 119 and carrying at its lower end a cam roll 120 actuated at suitable times by a cam 121 formed on the cam disk 63ª. The cam roll 120 is normally out of engagement with the cam, being moved to the left out of its path of movement, but at the completion of the lacing operation it is moved laterally into engagement with the cam by the controlling mechanism hereafter described. A spring 122 normally holds the pusher in retracted position as shown in Fig. 10.

The machine is provided with automatic controlling mechanism which operates, after the machine has been set into motion by the operator, to permit the main shaft to make a certain number of rotations corresponding to the number of stitches to be formed, and then to disconnect the shaft from the power so as to cause it to stop. The controlling mechanism also operates, previous to stopping the machine, to throw the pusher 115 into operation, and to simultaneously interrupt the feeding of the work so as to cause the last stitch to be made without any feed. This mechanism is constructed as follows: A pulley 125 is loosely journaled upon the shaft 13 and is constantly rotated by a belt from any suitable source of power. The pulley is provided with a conical clutch surface, as shown in dotted lines Fig. 6, co-operating with a conical clutch member 126 splined on the shaft 13 and normally held out of engagement with the pulley by a compression spring 124. The clutch member 126 has a hub 127, and a collar 128 is fixed to the shaft 13, close to the hub 127. A beveled roll 129 is journaled in the end of an arm 130 fixed to a horizontal rock shaft 131 journaled in the frame of the machine. A horizontal arm 132 (Fig. 2) is fixed to the other end of the rock shaft 131 and is connected by a rod 141 with a treadle (not shown) by which the machine is thrown into operation by the operator. When the treadle is depressed the arm 132 is drawn down, and, through the connections above described, the roll 129 is forced into the space between the hub 127 and collar 128, thereby causing the clutch member 126 to engage and be rotated by the pulley 125, and thus the machine is set in motion.

The arm 132 (see Fig. 2) carries a horizontal slide guide 133 upon which is slidingly mounted a block 134. A grasshopper spring 135, engaging the block 134 and a pin 136 on the slide guide 133, normally tends to move the block 134 to the left, as shown in Fig. 7, which is the position occupied by the block when the machine is at rest. When the arm 132 is depressed by means of the treadle, as above described, the slide guide 133 and the block 134 are depressed, and a pin 137 fixed in an arm 138 projecting from the block 134 is caused to engage a helical groove 139 formed on the main shaft 13. At the same time a swinging latch 142 depending from a sleeve 143 pivoted upon a stud 144 on the frame of the machine, swings into position above the arm 138 so as to maintain the pin 137, block 134, and the parts connected therewith, in the position to which they are moved by depressing the treadle, and thus the treadle can be released by the operator after the machine has once been set in operation. As soon as the pin 137 engages the groove, it commences, together with the block 134, to move to the right, owing to the rotation of the shaft 13, and this movement continues so long as the latch 142 engages the arm 138. The latch is elongated, as shown in Fig. 7, so that several rotations of the main shaft are required to move the block 134 far enough to the right upon the slide guide 133 to permit the arm 138 to move beyond the extremity of the latch, and during this time the machine operates to lace the sides of the upper together and to make the last finishing stitch by which the lacing is secured.

The rock shaft 131 has upwardly-extending arms 145 and 146 in which the shaft 119 is slidingly mounted. This shaft passes through an elongated slot 147 in the frame of the machine. A compression spring 148 mounted upon the shaft engages the cam lever 118 by which the pusher is actuated, and normally maintains it in its left-hand position, as shown in Fig. 7, so that the cam roll 120 is to the left of the cam so as not to be engaged and actuated thereby. An arm 149 is fixed to the right-hand end of the shaft 119 and carries an adjustable screw 150 which is in position to be engaged by a lug on the block 134 when the latter is moved to the right and shortly before it is disengaged from the latch 142. By these means the shaft 119 is moved to the right at the proper time in the operation of the machine and the pusher 115 is caused to operate so as to move the upper laterally and cause the needle to descend outside of the edge of the upper. The means for interrupting the feed at this point are constructed as follows: A lever 151 pivoted upon a bracket 152 on the frame of the machine, is so located that its upper end is in position to be engaged by a depending lug 153 on the block 134, at the same time that the arm 149 is engaged and moved. When the lower end of the lever 151 is thus swung to the left, a pawl 154 pivoted at 155 on the lever 151 engages the extremity 156 of a rod 157 mounted to slide in the frame of the machine. This rod carries lugs 158 and 159 which embrace the end of the cam lever 109 by which the eyelet feed mechanism is actuated. The lug 158 is free to slide upon the rod 157 but is normally moved to its left-hand position by a compression spring 160 engaging the lug and a collar 161 fixed to the rod 157. A spring 162 normally maintains the rod 157 in its right-hand position, in which the lugs do not interfere with the operation of the cam lever 109. When the rod 157 is moved to the left, as above described, the lug 159 bears upon the lever 109 and the spring 160 is compressed until the cam 12 has rotated to the point at which it is provided with a gap 163 (see Figs. 8 and 9), and thereupon the cam roll 110 passes out through this gap. By the continued movement of the lever 151 the pawl 154 is carried above the extremity 156 of the rod so that the latter is released and the spring 162 tends to move it again to the right. By this time, however, the cam has rotated sufficiently to move the gap 163 away from the cam roll, and the latter is retained in contact with the flat outer surface 164 of the cam until the continued rotation thereof brings the gap 163 again in engagement with the cam roll, whereupon the cam again enters the cam path ready to operate when the machine is again started.

In order that the number of eyelets in which the lacing is inserted may be varied for different classes of work, a series of holes 165 are provided in the casing of the controlling mechanism, and a stop-pin may be inserted in any one of these holes to limit the left-hand movement of the slide block 134 and thereby determine the number of rotations of the main shaft which occur before the operation of the machine is automatically interrupted.

In order to support the upper during the operation thereof the machine is provided with a work table 166. Upon the bottom of the work table are slide guides 167 engaging flanges 168 on the upper ends of brackets 169 on the frame of the machine. This permits the table to be retracted to facilitate the removal of the laced upper from the machine, and springs 170 hold the table normally in its forward position.

The operation of the machine as a whole is as follows: The operator draws back the table 166 and then carries the end of the lacing cord from the tension wheel to the right over the thread guide 41 and then back again to the tension wheel, in order to cause the end of the thread to be drawn through the second pair of eyelet holes with the thread from the thread supply. The upper is then placed upon the table and inserted between the upper and lower portions of the eyelet-feeding mechanism. The treadle is then depressed and the machine thrown into operation. The eyelet locating and feeding devices immediately engage an eyelet and advance it into position beneath the needle, and the needle descends through the eyelets. The thread guide then moves toward the needle thereby drawing the lacing thread across the hook of the needle, and the needle rises with a loop of the thread. The thread puller 24 then moves backward to the position shown in Fig. 2, so as to draw back the needle loop, and upon the next succeeding downward movement of the needle and the cast-off 14 the latter enters the loop and rotates to a position in front of the needle, thereby holding the old loop in its hooked extremity. At the same time the eyelet-feeding mechanism feeds the work again so that upon the succeeding descent of the needle it engages a fresh pair of eyelet holes. While the needle is in its raised position the thread finger 50 rises and its upper extremity moves rearwardly and engages the two threads between the tension wheel and the eyelets which the needle has just left, and upon the succeeding descent of the needle the thread finger falls, thereby drawing down a loop of thread, part of which is obtained from the loop already formed by the needle and part from the thread supply. By this same operation the thread is drawn down into the notch at the upper end of the thread guide in position to be again presented to the needle. While the loop of thread is so held down by the thread finger one of the loop-retainer pins 41 is pushed forward into the loop, and when the loop is released by the thread finger it is retained by the loop retainer and thus the required amount of slack thread is maintained in each stitch. The needle then descends through the old loop and the empty eyelets, as above described, and is supplied again with the thread by the thread guide. The position of the members at this time in the operation of the machine is shown with substantial accuracy in Fig. 16, except that the machine is shown as having formed two complete stitches. Upon the subsequent rising movement of the needle it draws the new loop through the old loop and the cast-off rotates to the rear of the needle, thereby disengaging and releasing the old loop, from which the slack is subsequently drawn by the thread finger in drawing down its loop. It will be noted that the thread finger, in addition to its functions of shortening the needle loops above the work and supplying the slack thread to the loop retainers, operates also to supply slack thread between the needle and the last-engaged eyelets to permit the needle to pass upward through the eyelets without any rendering of thread in the hook of the needle. This is accomplished by making the downward movement of the thread finger greater than is necessary to supply thread to the loop retainer pin. After the predetermined number of eyelets has been engaged and laced in this manner, the pusher 115 operates automatically and moves the upper into the position shown in Fig. 18. A stitch is then taken outside of the edge of the upper, as shown in said figure, and the machine then comes automatically to rest. The operator thereupon cuts the thread, releases the loops from the needle and from the loop retainers, and removes the work from the machine, the table being drawn forward, as above described, to permit the loops to be withdrawn from the loop retainers. After threading the machine, as above described, it is again ready to operate.

Although the automatic eyelet-locating and feeding devices, and the automatic mechanism for causing the end of the lacing to be secured, have been described as embodied in a machine operating to make a series of chain stitches in both sides of an upper simultaneously, it will be understood that these novel devices are not limited to use in connection with such a machine, but that they may be used in machines of various forms for lacing uppers without respect to the manner in which the thread is introduced into the eyelet holes, and regardless of the number of eyelet holes so laced or the position in which the upper is held during the lacing operation.

With respect to the eyelet-locating and feeding devices, it is broadly new, so far as the inventor is aware, to use automatic mechanism which will operate to properly feed and locate eyelets regardless of the variations in their spacing and position, and, more specifically, it is new to cause such feeding devices to operate upon eyelets in advance of the thread-handling instrumentalities.

The invention is not in general limited to the details of construction and operation of the illustrated embodiment, but may be embodied in other forms broadly defined in the claims.

Having now described the invention, what is claimed is:—

1. A machine for lacing shoe uppers, having, in combination, means for automatically engaging and locating the eyelets, and independent means for inserting a lacing therein, substantially as described.

2. A machine for lacing shoe uppers, having, in combination, means for automatically engaging and locating successive eyelets, and independent means for inserting a lacing in the eyelets, substantially as described.

3. A machine for lacing shoe uppers, having, in combination, means for inserting a lacing in the eyelets successively, and automatic feeding means engaging an eyelet in advance of the one so operated upon and acting to feed it into position to receive the lacing, substantially as described.

4. A machine for lacing shoe uppers, having, in combination, means for forming a series of stitches in a succession of eyelets, and automatic means for engaging the eyelets successively and feeding the engaged eyelet into stitch receiving position, substantially as described.

5. A machine for lacing shoe uppers, having, in combination, means for forming a series of chain stitches in a succession of eyelets, and means for automatically engaging the eyelets successively and feeding the engaged eyelet into stitch receiving position, substantially as described.

6. A machine for lacing shoe uppers, having, in combination, means for inserting a lacing in an eyelet, and means for automatically engaging the flange of an eyelet and locating the eyelet in position to receive the lacing, substantially as described.

7. A machine for lacing shoe uppers, having, in combination, means for inserting a lacing in the eyelets, and means for automatically engaging the flanges of the eyelets successively and feeding them into position to receive the lacing, substantially as described.

8. A machine for lacing shoe uppers, having, in combination, means for inserting a lacing in the eyelet, and means for automatically locating the eyelet comprising devices arranged to receive the eyelet between them and then to approach each other until they engage the flange of the eyelet, substantially as described.

9. A machine for lacing shoe uppers, having, in combination, means for inserting a lacing in successive eyelets, and means for feeding the eyelets successively into position to receive the lacing comprising a device for engaging the flange of the eyelets and means for moving said device in the direction of feed, substantially as described.

10. A machine for lacing shoe uppers, having, in combination, means for inserting a lacing in successive eyelets, and means for feeding the eyelets successively into place to receive the lacing, comprising a device yieldingly engaging the upper in line with the row of eyelets, and means for reciprocating said device in the line of feed to cause it to engage the flanges of the eyelets and thereby move them in the direction of feed, substantially as described.

11. A machine for lacing shoe uppers, having, in combination, means for inserting a lacing into successive eyelets, and means for locating and feeding the eyelets successively, comprising a feed member and two lateral locating members acting to approach each other until they engage the flange of an eyelet and then to move in the direction of feed, substantially as described.

12. A machine for lacing shoe uppers, having, in combination, means for forming chain-stitches, independent feeding means for feeding the eyelets into position to receive the stitches, and means for moving the upper transversely with respect to the line of feed to cause a fastening stitch to be formed outside its edge, substantially as described.

13. A machine for lacing shoe uppers, having, in combination, means for inserting loops in a succession of eyelets, a series of pins to retain the loops to preserve slack thread therein until the completion of the operation, and means for moving the pins longitudinally in succession to receive the loops as they are formed, substantially as described.

14. A machine for lacing shoe uppers, having, in combination, means for inserting a lacing in a succession of eyelets, and automatic means for interrupting the operation of the machine after a certain number of eyelets have been operated upon, said means being adjustable to cause the machine to operate upon different numbers of eyelets, substantially as described.

15. A machine for lacing shoe uppers, having, in combination, lace inserting devices and independent devices acting automatically to aline eyelets in the opposite sides of an upper and position them in register with the lace inserting devices, substantially as described.

16. A machine for lacing shoe uppers, having, in combination, lace inserting devices and independent eyelet alining and positioning devices and means for operating the latter devices to aline and position successive pairs of eyelets, substantially as described.

17. A machine for lacing shoe uppers, having, in combination, lace inserting devices and eyelet positioning devices arranged to engage the flanges of the eyelets, substantially as described.

18. A machine for lacing shoe uppers, having, in combination, lace inserting devices and devices for embracing the eyelets on opposite sides of an upper and bringing them into alinement, substantially as described.

19. A machine for lacing shoe uppers, having, in combination, lace inserting devices, and means for engaging an eyelet and feeding the engaged eyelet into position to receive the lace, substantially as described.

20. A machine for lacing shoe uppers, having, in combination, lace inserting devices for inserting a lace in the eyelets successively, and means for engaging the eyelet next succeeding that into which the lace has been last inserted and feeding it into position to receive the lace, substantially as described.

21. A machine for lacing shoe uppers, having, in combination, lace inserting devices, feeding devices, and mechanism for actuating the feeding devices to engage each eyelet and to advance the engaged eyelet into lace receiving position, substantially as described.

22. A machine for lacing shoe uppers, having, in combination, lace inserting devices and feeding devices arranged to engage and aline eyelets in the opposite sides of an upper and advance them into lace receiving position, substantially as described.

23. A machine for lacing shoe uppers, having, in combination, lace inserting devices and feeding devices arranged to operate upon eyelets in advance of the lace inserting devices, substantially as described.

24. A machine for lacing shoe uppers, having, in combination, lace inserting devices and devices acting to aline eyelets in the opposite sides of an upper and feed them into register with the lace inserting devices, substantially as described.

25. A machine for lacing shoe uppers, having, in combination, means for inserting loops in a succession of eyelets, a series of loop retaining pins, and means for engaging and carrying the successive loops into position to be engaged by the pins, substantially as described.

26. A machine for lacing shoe uppers, having, in combination, means for forming and inserting a series of loops in the eyelets of an upper, a series of loop retaining devices, and means for engaging the successive loops and delivering them to the loop retaining devices, substantially as described.

27. A machine for lacing shoe uppers, having, in combination, means for inserting a lacing in a succession of eyelets, means for interrupting the operation of the machine after a certain number of eyelets have been operated upon, and means for varying the operation of said interrupting means for different numbers of eyelets, substantially as described.

28. A machine for lacing shoe uppers, having, in combination, lace inserting mechanism, feeding mechanism for bringing the eyelets successively to the lace inserting mechanism, means for relatively moving the upper and lace inserting mechanism to form a fastening stitch outside the edge of the upper, and a controlling mechanism for interrupting the feed throwing into operation the mechanism for relatively moving the lace inserting mechanism and upper and thereafter interrupting the operation of the machine, substantially as described.

29. A machine for lacing shoe uppers, having, in combination, a hook needle, a looper, a cast-off, loop retaining devices and a thread finger for engaging the thread on the side of the work opposite the needle, and means for operating the thread finger to deliver the loop to the loop retaining devices and to give up thread to the needle during its loop drawing stroke, substantially as described.

30. A machine for lacing shoe uppers, having, in combination, a hook needle, a looper, a cast-off, and means other than the needle for engaging the eyelets of an upper and successively feeding them into position to receive the needle, substantially as described.

31. A machine for lacing shoe uppers, having, in combination, lace inserting devices for inserting a lace in the eyelets successively, means for alining the successive pairs of eyelets in opposite sides of an upper and positioning them in register with the lace inserting devices, and loop retaining devices for retaining slack thread in the loops during the lace inserting operation, substantially as described.

32. A machine for lacing shoe uppers, having, in combination, lace inserting devices for inserting a lace in the eyelets successively, means for automatically engaging the eyelets in the opposite sides of an upper and positioning them in register with the lace inserting devices, devices for retaining slack thread in the loops of lacing, and means for relatively moving the lace inserting devices and upper to form a fastening stitch outside the edge of the upper, substantially as described.

In testimony whereof I affix my signature, in presence of two witnesses.

ERASTUS E. WINKLEY.

Witnesses:
  IRA L. FISH,
  ANNIE C. RICHARDSON.

cessively, means for alining the successive pairs of eyelets in opposite sides of an upper and positioning them in register with the lace inserting devices, and loop retaining devices for retaining slack thread in the loops during the lace inserting operation, substantially as described.

32. A machine for lacing shoe uppers, having, in combination, lace inserting devices for inserting a lace in the eyelets successively, means for automatically engaging the eyelets in the opposite sides of an upper and positioning them in register with the lace inserting devices, devices for retaining slack thread in the loops of lacing, and means for relatively moving the lace inserting devices and upper to form a fastening stitch outside the edge of the upper, substantially as described.

In testimony whereof I affix my signature, in presence of two witnesses.

ERASTUS E. WINKLEY.

Witnesses:
 IRA L. FISH,
 ANNIE C. RICHARDSON.

---

Correction in Letters Patent No. 1,075,530.

It is hereby certified that in Letters Patent No. 1,075,530, granted October 14, 1913, upon the application of Erastus E. Winkley, of Lynn, Massachusetts, for an improvement in "Machines for Lacing Shoe-Uppers," an error appears in the printed specification requiring correction as follows: Page 3, strike out line 119, and insert the words and reference-numeral, *arms 91. The forward extremities of the;* and that the said Letters Patent should be read with this correction therein that the same may conform to the record of the case in the Patent Office.

Signed and sealed this 28th day of October, A. D., 1913.

[SEAL.]

THOMAS EWING,

*Commissioner of Patents.*

It is hereby certified that in Letters Patent No. 1,075,530, granted October 14, 1913, upon the application of Erastus E. Winkley, of Lynn, Massachusetts, for an improvement in "Machines for Lacing Shoe-Uppers," an error appears in the printed specification requiring correction as follows: Page 3, strike out line 119, and insert the words and reference-numeral, *arms 91. The forward extremities of the;* and that the said Letters Patent should be read with this correction therein that the same may conform to the record of the case in the Patent Office.

Signed and sealed this 28th day of October, A. D., 1913.

[SEAL.]

THOMAS EWING,
*Commissioner of Patents.*